US012690104B2

(12) United States Patent
Roy

(10) Patent No.: US 12,690,104 B2
(45) Date of Patent: Jul. 21, 2026

(54) METHOD FOR CONTROLLING THE ILLUMINATION OF AT LEAST ONE LIGHT SOURCE ARRANGED AT AN END OF AT LEAST ONE LIGHT GUIDE

(71) Applicant: VALEO VISION, Bobigny (FR)

(72) Inventor: Julien Roy, Bobigny (FR)

(73) Assignee: Valeo Vision, Bobigny (FR)

( * ) Notice: Subject to any disclaimer, the term of this patent is extended or adjusted under 35 U.S.C. 154(b) by 30 days.

(21) Appl. No.: 18/716,316

(22) PCT Filed: Dec. 6, 2022

(86) PCT No.: PCT/EP2022/084676
§ 371 (c)(1),
(2) Date: Jun. 4, 2024

(87) PCT Pub. No.: WO2023/104839
PCT Pub. Date: Jun. 15, 2023

(65) Prior Publication Data
US 2025/0040011 A1 Jan. 30, 2025

(30) Foreign Application Priority Data
Dec. 6, 2021 (FR) ...................................... 2113031

(51) Int. Cl.
*H05B 45/325* (2020.01)
*B60Q 1/00* (2006.01)
*B60Q 1/14* (2006.01)

(52) U.S. Cl.
CPC ......... *H05B 45/325* (2020.01); *B60Q 1/0011* (2013.01); *B60Q 1/1415* (2013.01)

(58) Field of Classification Search
CPC .. H05B 45/325; B60Q 1/0011; B60Q 1/1415; B60Q 2900/40; B60Q 1/381
See application file for complete search history.

(56) References Cited

U.S. PATENT DOCUMENTS 7,012,384 B2    3/2006   Tatewaki et al.
9,118,259 B2 *  8/2015   Ye ..................... H02M 7/53871
(Continued)

FOREIGN PATENT DOCUMENTS

CN        108076561 A  *  5/2018   ............. H05B 45/10
CN        118432528 A  *  8/2024   ............. F24S 30/40
(Continued)

OTHER PUBLICATIONS

European Patent Office, International Search Report (with English translation) and Written Opinion of corresponding International Application No. PCT/EP2022/084676, dated Mar. 1, 2023.

*Primary Examiner* — Abdullah A Riyami
*Assistant Examiner* — Syed M Kaiser
(74) *Attorney, Agent, or Firm* — Valeo Vision

(57) ABSTRACT

The invention relates to a method for controlling the illumination of at least one light source arranged at an end of at least one at least partially transparent or translucent light guide, the method being implemented by a driver device for driving the light source. According to the invention, the driver device is configured to control the illumination of the light source by means of pulse-width modulation and the method includes a first phase in which the illumination of the light source is controlled according to a first control ramp until a first level of intermediate lighting of the light source is reached and a second phase in which the illumination of the light source is controlled according to a second control ramp until a second level of lighting of the light source is reached, the slopes of the first and second control ramps being separate.

12 Claims, 5 Drawing Sheets

(56)                  References Cited

U.S. PATENT DOCUMENTS

| | | | | |
|---|---|---|---|---|
| 9,772,085 | B2 | 9/2017 | Dubosc | |
| 9,840,186 | B2 * | 12/2017 | Ichikawa ............... | H05B 45/10 |
| 10,436,413 | B2 | 10/2019 | Asakawa et al. | |
| 2010/0327764 | A1 * | 12/2010 | Knapp .................... | H04L 12/43 |
| | | | | 315/307 |
| 2014/0043856 | A1 * | 2/2014 | Thompson ........... | G02B 6/0045 |
| | | | | 977/932 |
| 2016/0091162 | A1 * | 3/2016 | Dubosc .................. | F21S 43/15 |
| | | | | 362/511 |
| 2017/0188419 | A1 * | 6/2017 | Gaertner ................ | H05B 45/14 |

FOREIGN PATENT DOCUMENTS

| | | | | | | |
|---|---|---|---|---|---|---|
| JP | 2019055726 | A | * | 4/2019 | ............. | B60Q 1/381 |
| WO | WO-2013120124 | A2 | * | 8/2013 | ............ | F21S 43/241 |

* cited by examiner

METHOD FOR CONTROLLING THE ILLUMINATION OF AT LEAST ONE LIGHT SOURCE ARRANGED AT AN END OF AT LEAST ONE LIGHT GUIDE

TECHNICAL FIELD

The present invention belongs to the field of lighting and in particular of motor-vehicle lighting. The invention in particular relates to a method for controlling turn-on of at least one light source placed at one end of at least one light guide that is at least partially transparent or translucent, and to a luminous device comprising a driver configured to implement such a method. Without this being limiting in the context of the present invention, the luminous device may be mounted in a motor-vehicle headlamp. The present invention is also applicable to luminous devices intended for lighting the interior of a vehicle (i.e. to luminous devices mounted in the ceiling light of the vehicle for example) or even to luminous devices that produce a signature or visual animations on the vehicle.

BACKGROUND OF THE INVENTION

In the field of automotive lighting, luminous devices mounted in a vehicle headlamp to project light beams performing photometric lighting and/or signaling functions are generally known. In particular, in order to perform a direction-indicating function of the vehicle, the light beam may be a scrolling illumination beam, i.e. produce what is called a "sequential" effect. The latter is obtained using a luminous device that conventionally comprises a light guide that is at least partially transparent or translucent, two light sources that are essentially point-like (light-emitting diodes) placed at the ends of the light guide, and a driver for driving the two light sources.

Published patent document U.S. Pat. No. 10,436,413 B2 discloses such a luminous device. The driver present within the luminous device is configured to control turn-on of each of the light sources. More precisely, the method for controlling turn-on of the light sources is carried out in the following way: in a first step, turn-on control according to a first control ramp is used by the driver to turn on a first light source (to gradually turn on the light source). In a second step, performed after the first step, turn-on control according to a second control ramp is used by the driver to turn on the second light source. The first and second control ramps are programmed into the driver and defined beforehand so that the first light source and second light source reach their respective maximum illumination levels at the same time. The maximum illumination level of a light source corresponds to the level at which the luminous intensity of the light emitted by this light source is maximum. It will thus be understood that the first and second control ramps are distinct. Implementation of such a control scheme to turn on the two light sources, with a time lag between turn-on of the two light sources and simultaneous arrival at their maximum illumination level, makes it possible to obtain a scrolling or "sequential" effect. In other words, the light appears to move in the light guide from the first light source to the second light source, until the light guide is fully illuminated. The command used to turn off the two light sources is then sent by the driver at the same time, the light sources turning off completely either with a time lag (turn-off control ramps of the first and second light sources having distinct slopes), or simultaneously (turn-off control ramps of the first and second light sources having identical slopes).

However, the scrolling effect produced by such a turn-on control method is relatively coarse. Specifically, spots or luminous segments that do not meet motor-vehicle lighting regulations may appear during turn-on of the light sources. Furthermore, the illumination beam generated in the light guide by such a method lacks uniformity, this making the scrolling effect blurred and difficult for a user to see.

SUMMARY OF THE INVENTION

The present invention aims to improve the situation.

One objective of the invention is to provide a method for controlling turn-on of at least one light source allowing the refinement and uniformity of the scrolling illumination beam generated in the light guide to be improved, while reducing costs and without requiring a complex electronic design.

To this end, a first aspect of the invention relates to a method for controlling turn-on of at least one light source placed at one end of at least one light guide that is at least partially transparent or translucent, the method being implemented by a light-source driver connected to said at least one light source. Here, by "light guide" what is meant is any optical part capable of guiding light by total internal reflection of this light, for example from an entrance region to an exit region. Moreover, by "driver" what is meant is any device for converting an electrical supply delivered by an electrical supply network into an electrical supply suitable for performance of a desired luminous function, and potentially able to deliver said electrical supply suitable for a light source with a view to having said desired luminous function performed. The light source is preferably an essentially point-like light source, such as a light-emitting diode.

According to the invention, the driver is configured to use pulse-width modulation to turn on the light source, and the method comprises:

a first phase in which pulse-width-modulation-based control according to a first control ramp is used to turn on the light source, the first control ramp being up to a first intermediate illumination level of the light source, i.e. to a first duty-cycle value corresponding to said first intermediate illumination level; and, a second phase in which pulse-width-modulation-based control according to a second control ramp is used to turn on the light source, the second control ramp being up to a second illumination level of the light source, i.e. to a second duty-cycle value corresponding to said second illumination level, the slopes of the first and second control ramps being distinct, the luminous intensity of the light emitted by the light source at its second illumination level being greater than the luminous intensity of the light emitted by the light source at its first illumination level.

Optionally, but preferably, the second illumination level of the light source corresponds to the maximum illumination level of this light source.

Optionally, the first and second control ramps are linear ramps obtained from affine functions, i.e. functions such as $f(x)=ax+b$, where x is the variable and the parameters a and b are constants and one of these two parameters may be zero.

Thus, through use of pulse-width modulation and of two distinct control ramps to turn on the light source, the turn-on control method according to the invention makes it possible to improve the refinement and uniformity of the scrolling illumination beam generated in the light guide. Furthermore, the method according to the invention allows the number of light sources required to generate the scrolling illumination beam to be decreased, thereby contributing to reducing costs and simplifying the electronic design of the assembly.

According to one preferred embodiment of the invention, the turn-on control method is applied to at least one assembly, and preferably two assemblies, said at least one assembly comprising a light guide that is at least partially transparent or translucent and two light sources, each light source being placed at a separate end of the light guide and being connected to the driver, the first phase of the method comprising:

a first step in which pulse-width-modulation-based control according to a first control ramp is used to turn on a first light source, the first control ramp being up to a first intermediate illumination level of the first light source, i.e. to a first duty-cycle value corresponding to said first intermediate illumination level of the first light source, and, a second step, performed after the start of the first step, in which pulse-width-modulation-based control according to a third control ramp is used to turn on a second light source, the third control ramp being up to a first intermediate illumination level of the second light source, i.e. up to a third duty-cycle value corresponding to said first intermediate illumination level of the second light source.

Furthermore, the second phase of the method comprises a first step in which pulse-width-modulation-based control according to a second control ramp is used to turn on the first light source to a second illumination level of the first light source, the second control ramp being up to a second duty-cycle value corresponding to said second illumination level of the first light source, and, a second step in which pulse-width-modulation-based control according to a fourth control ramp is used to turn on the second light source to a second illumination level of the second light source, the fourth control ramp being up to a fourth duty-cycle value corresponding to said second illumination level of the second light source, the slopes of the first and second control ramps, and of the third and fourth control ramps, respectively, being distinct.

Thus, by increasing the luminous intensity of the first light source a number of times (at least twice) via distinct turn-on control ramps, and by turning on the second light source with a time lag, a scrolling effect appears visually in the light guide.

Advantageously, the first step of the first phase is longer than the second step of the second phase, in order to remain below the saturation threshold of the eyes for as long as possible. As a result, the scrolling effect is better perceived.

Advantageously, the second illumination level of the first light source corresponds to the maximum illumination level of this light source. To this end, the second duty-cycle value may be equal to 100%.

Advantageously, the second illumination level of the second light source corresponds to the illumination level of this light source. To this end, the fourth duty-cycle value may be equal to 100%.

According to one embodiment of the invention, the method further comprises an intermediate step between the second step of the first phase and the second step of the second phase, the illumination of the second light source remaining constant throughout this intermediate step, and corresponding to the first intermediate illumination level of the second light source. Described otherwise, the duty cycle that corresponds to the first intermediate illumination level of the second light source, also called the third duty-cycle value, is applied to the second light source throughout the intermediate step.

According to one embodiment of the invention, the method further comprises a third phase and a fourth phase, the third phase of the method comprising:

a first step in which pulse-width-modulation-based control according to a fifth control ramp is used to turn on the first light source to the first intermediate illumination level of the first light source, the fifth control ramp being up to the first duty-cycle value, and a second step in which pulse-width-modulation-based control according to a sixth control ramp is used to turn on the second light source to the first intermediate illumination level of the second light source, the sixth control ramp being up to the third duty-cycle value.

Furthermore, the fourth phase of the method comprises:

a first step in which pulse-width-modulation-based control according to a seventh control ramp is used to turn off the second light source, and a second step, performed after the first step, in which pulse-width-modulation-based control according to an eighth control ramp is used to turn off the first light source, the slopes of the fifth and eighth control ramps, and of the sixth and seventh control ramps, respectively, being distinct.

This makes it possible to create, in the light guide, after the first scrolling luminous effect, a second scrolling luminous effect that scrolls in the opposite direction to the first scrolling effect.

According to one embodiment of the invention, the two light sources and the light-source driver are arranged in a vehicle luminous device, preferably in a luminous device performing a signaling function, and preferably in a direction-indicating device, and the luminous intensity of the light emitted by the first light source at its first illumination level is lower than the luminous intensity of the light emitted by the first light source at its second illumination level. Preferably, the first illumination level remains below the saturation threshold of the eye of an observer. This allows the effect whereby the light seems to scroll through the guide in the first step of the first phase to be clearly seen.

According to one embodiment of the invention, the duration of the first step of the first phase of the method is less than or equal to the cumulative duration of the respective first steps of the first and second phases of the method. Preferably, the duration of the first step of the first phase of the method is at least equal to half the cumulative duration of the respective first steps of the first and second phases of the method, and at most equal to the entire cumulative duration. In one example of embodiment, the duration of the first step of the first phase of the method is equal to two thirds of the cumulative duration of the respective first steps of the first and second phases of the method (optionally with a last flash of light at the end of the second phase). In another example of embodiment, the duration of the first step of the first phase of the method is equal to fifteen sixteenths of the cumulative duration of the respective first steps of the first and second phases of the method (optionally with a last flash of light at the end of the second phase).

The combination of this ratio between the turn-on times of the first light source and of the feature whereby the luminous intensity of the light emitted by the first light source at its first illumination level is less than the luminous intensity of the light emitted by the first light source at its second illumination level makes it possible to remain below the saturation threshold of the human eye for as long as possible, thus allowing an observer to correctly see the scrolling effect.

According to one embodiment of the invention, the cumulative duration of the respective first steps of the first and second phases of the method is less than or equal to 200 ms. This makes it possible to comply with a standard in force regulating the direction-indicating functions of a vehicle, namely the regulation 006 UNECE. Specifically, this regulation stipulates that a direction indicator must not take longer than 200 ms to turn on.

According to one embodiment of the invention, the turn-on control method is further applied to at least one additional light source, said at least one additional light source being placed behind the light guide, and the method further comprises a third phase in which the light-source driver turns on said at least one additional light source, so as to finalize illumination of the light guide. In this embodiment, the presence of the one or more additional light sources makes it possible to improve the final illumination of the light guide once the scrolling luminous effect has ended.

Another subject of the invention relates to a vehicle luminous device comprising at least one light guide that is at least partially transparent or translucent, at least one light source placed at one end of the light guide, and a light-source driver connected to said at least one light source, the driver being configured to implement the turn-on control method according to the invention, to turn on said at least one light source.

According to one embodiment of the invention, said at least one light guide comprises, on its external surface, at least one striation extending substantially transversely to the main direction of extension of the light guide. The presence of these striations on the external surface of the light guide allows optical diffusion of the light rays delivered by the one or more light sources to be improved.

According to one preferred embodiment of the invention, the luminous device comprises at least one assembly, and preferably two assemblies, said at least one assembly comprising a light guide that is at least partially transparent or translucent and two light sources, each light source being placed at a separate end of the light guide, and the driver is connected to each of the light sources and is configured to implement the turn-on control method according to the invention, to turn on each of the light sources.

According to one embodiment of the invention, the light source is placed at a respective end of a plurality of light guides that are at least partially transparent or translucent. This embodiment makes it possible to reduce the number of light sources used.

According to one embodiment of the invention, the light guides are placed so as to substantially define a corolla shape, the light source being placed at the center of the corolla. According to one example of embodiment, a "tulip"-shaped part may be used to channel the light emitted by the light source into each of the light guides.

According to another embodiment, an additional light source may be placed at the other end of each of the light guides. Alternatively, the other ends of the light guides may be grouped together by a "tulip"-shaped part (two ends per tulip) to reduce the number of additional light sources.

According to one preferred embodiment of the invention, the luminous device is a vehicle-direction-indicating device.

According to one embodiment of the invention, the light guide is made of a plastic that is at least partially transparent or translucent, and in particular of polycarbonate (also called PC) or polymethyl methacrylate (also called PMMA).

Another subject of the invention relates to a vehicle headlamp, in particular for a motor vehicle, comprising a luminous device according to the invention.

Here, by "vehicle" what is meant is any type of vehicle, such as a motor vehicle, a moped, a motorbike, a warehouse robot, or any other machine able to carry at least one passenger or intended to transport people or objects.

Another subject of the invention relates to the use of a luminous device according to the invention to perform a photometric signaling function of a vehicle, in particular a direction-indicating function of the vehicle.

BRIEF DESCRIPTION OF THE DRAWINGS

Other features and advantages of the invention will become apparent on examining the following detailed description, and the appended drawings, in which.

In this document, the terms "horizontal", "vertical" or "transverse", "lower", "upper", "high", "low", and "side" are defined with respect to the orientation with which the luminous device according to the invention, or a component forming part of the luminous device according to the invention, is intended to be mounted in the vehicle. In particular, in this patent application, the term "vertical" designates an orientation perpendicular to the horizon, while the term "horizontal" designates an orientation parallel to the horizon.

DETAILED DESCRIPTION OF THE INVENTION

Figure 1:
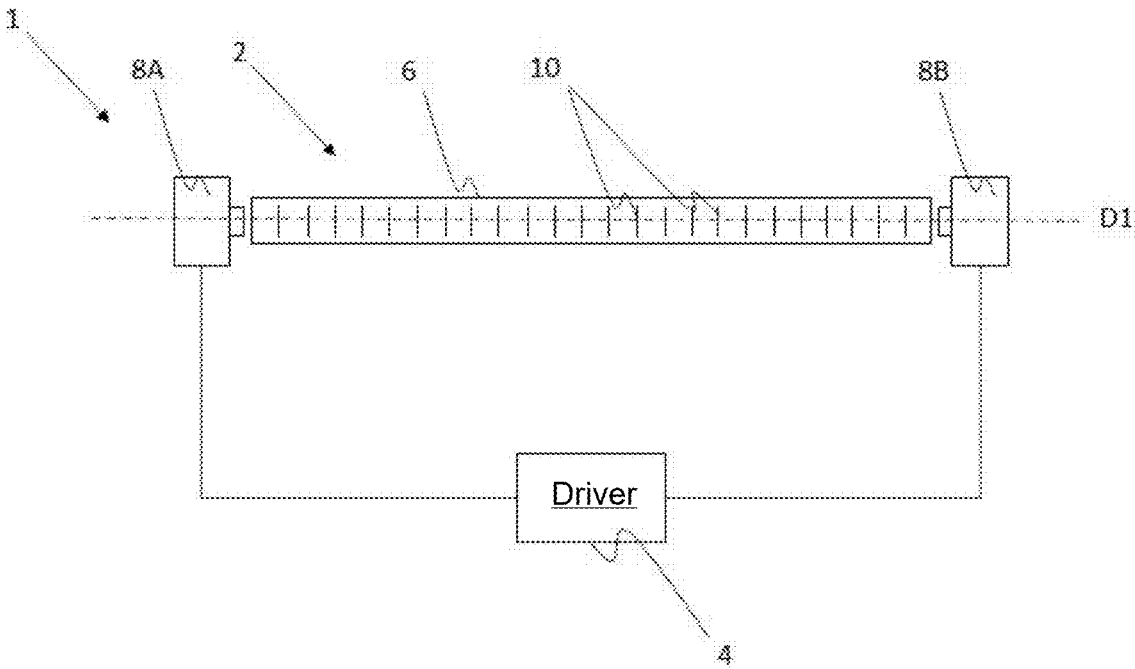
FIG. 1 is a schematic representation of a side view of a luminous device according to a first embodiment of the invention, the luminous device comprising two light sources and a driver for driving the light sources.

FIG. 1 is a schematic representation of a side view of a luminous device 1 according to a first embodiment of the invention.

The luminous device 1 comprises an assembly 2 and a light-source driver 4. The assembly 2 comprises a light guide 6 that is at least partially transparent or translucent, and two light sources 8A, 8B. Preferably, the luminous device 1 comprises two assemblies 2, although only one assembly 2 has been shown in FIG. 1 for the sake of clarity. The two assemblies 2 are then placed vertically one above the other. Also preferably, the assembly 2 further comprises at least one additional light source placed behind the light guide 6, such an additional light source not being shown in FIG. 1 for the sake of clarity.

The light guide 6 is advantageously a tubular light guide that is elongate in a substantially horizontal main direction of extension D1. Preferably, the light guide 6 comprises, on its external surface, striations 10 that extend substantially transversely to the main direction of extension D1 of the light guide 6. The light guide 6 is advantageously made of a plastic that is at least partially transparent or translucent, and in particular of polycarbonate (also called PC) or polymethyl methacrylate (also called PMMA).

Each light source 8A, 8B is placed at a separate end of the light guide 6. Each light source 8A, 8B is advantageously an essentially point-like light source, in particular a semiconductor light source, for example such as a light-emitting diode.

The driver 4 is connected to each of the light sources 8A, 8B and is configured to implement a method for controlling turn-on of the light sources 8A, 8B according to one example of embodiment of the invention, as will be described below. The driver 4 is configured to use pulse-width-modulation-based control to turn on each of the light sources 8A, 8B.

Figure 2:
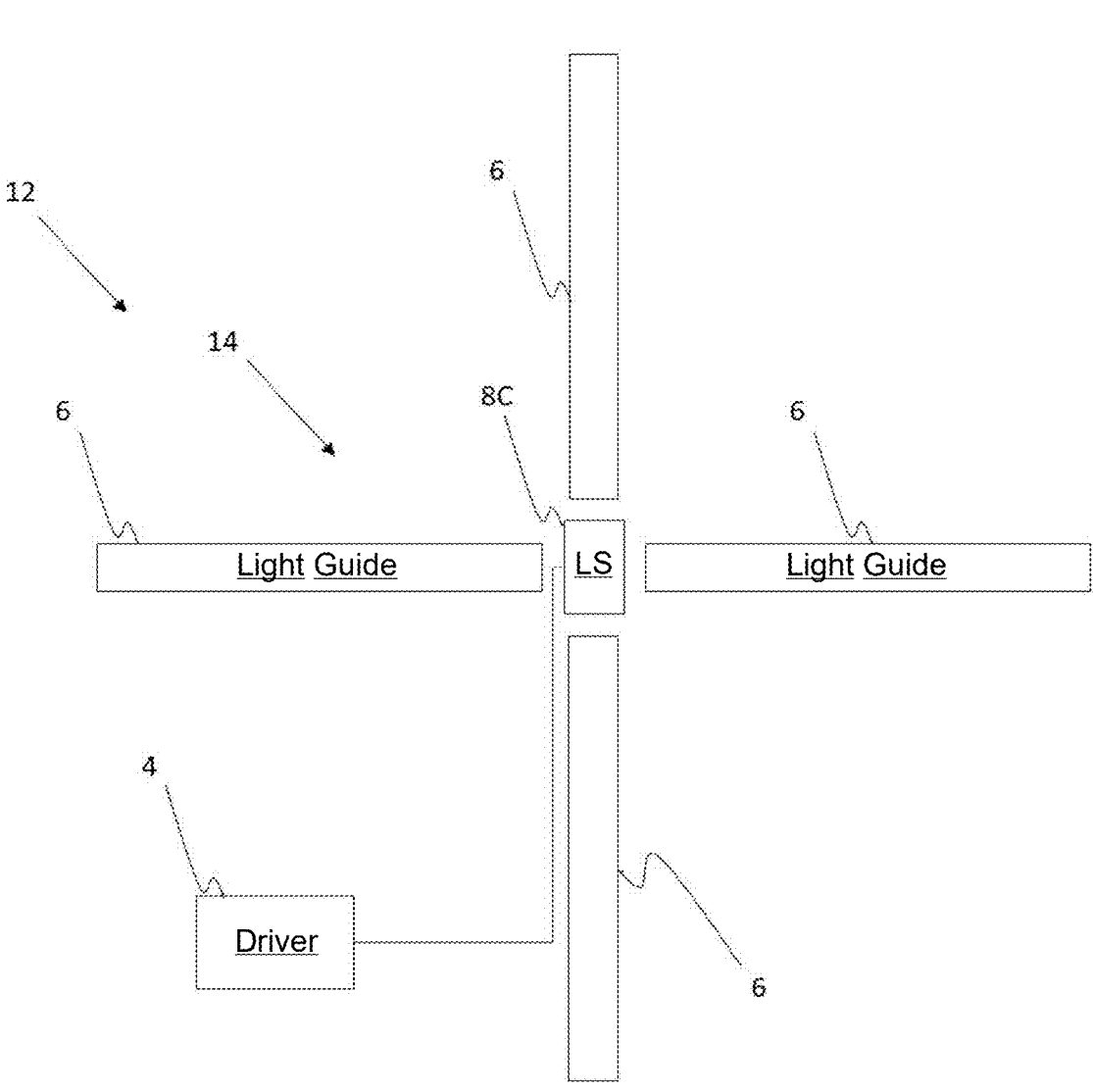
FIG. 2 is a schematic representation of a view from above of a luminous device according to a second embodiment of the invention, the luminous device comprising one light source and a driver for driving the light source.

FIG. 2 is a schematic representation of a view from above of a luminous device 12 according to a second embodiment of the invention. In FIGS. 1 and 2, elements designated by the same reference numbers are analogous and will therefore not be described in more detail below.

The luminous device 12 comprises a light-source driver 4, four light guides 6 that are at least partially transparent or translucent, and a single light source 8C. The driver 4 is connected to the light source 8C and is configured to use pulse-width-modulation-based control to turn on this light source 8C.

As illustrated in FIG. 2, the light source 8C is placed at one respective end of each of the light guides 6. More precisely, the light guides 6 are placed so as to substantially define a corolla shape 14, the light source 8C being placed at the center of the corolla 14. By way of example, a "tulip"-shaped part (not shown in FIG. 2 for the sake of clarity) may be used to channel the light emitted by the light source 8C into each of the light guides 6. The light source 8C is advantageously an essentially point-like light source, in particular a semiconductor light source, for example such as a light-emitting diode. According to one variant of embodiment, an additional light source (not shown) may be placed at the other end of each of the light guides 6. Alternatively, the other ends of the light guides 6 may be grouped together by a "tulip"-shaped part (two ends per tulip) to reduce the number of additional light sources.

Figure 3:
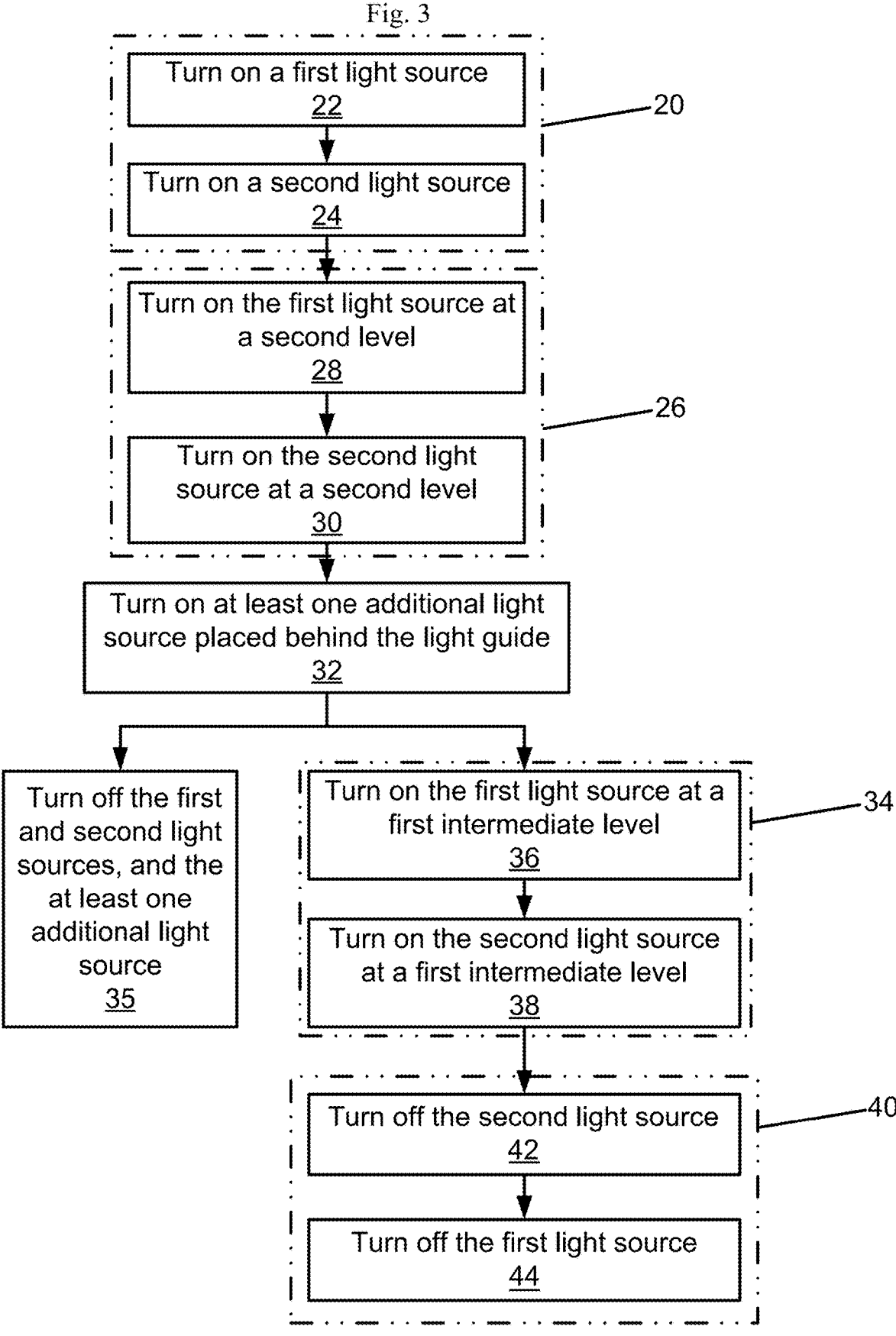
FIG. 3 is a flowchart showing a method for controlling turn-on of at least one light source according to the invention, the method being implemented by the driver of FIG. 1 or FIG. 2.

The method for controlling turn-on of at least one light source according to the invention, which is implemented by the driver 4, will now be described with reference to FIG. 3. The method is for example implemented by the driver of the luminous device 1 according to the first embodiment, in which case the method is applied to both light sources 8A, 8B; or else by the driver of the luminous device 12 according to the second embodiment, in which case the method is applied to the single light source 8C. For ease of description, the method will be described below with reference to the luminous device 1 according to the first embodiment with its two light sources 8A, 8B. At the start of the method, the two light sources 8A, 8B are turned off.

The method comprises a first phase 20. This first phase 20 comprises a first step 22 in which pulse-width-modulation-based control according to a first control ramp 23 is used to turn on a first light source 8A, the first control ramp being up to a first duty-cycle value corresponding to a first intermediate illumination level of the first light source 8A.

Figure 4:
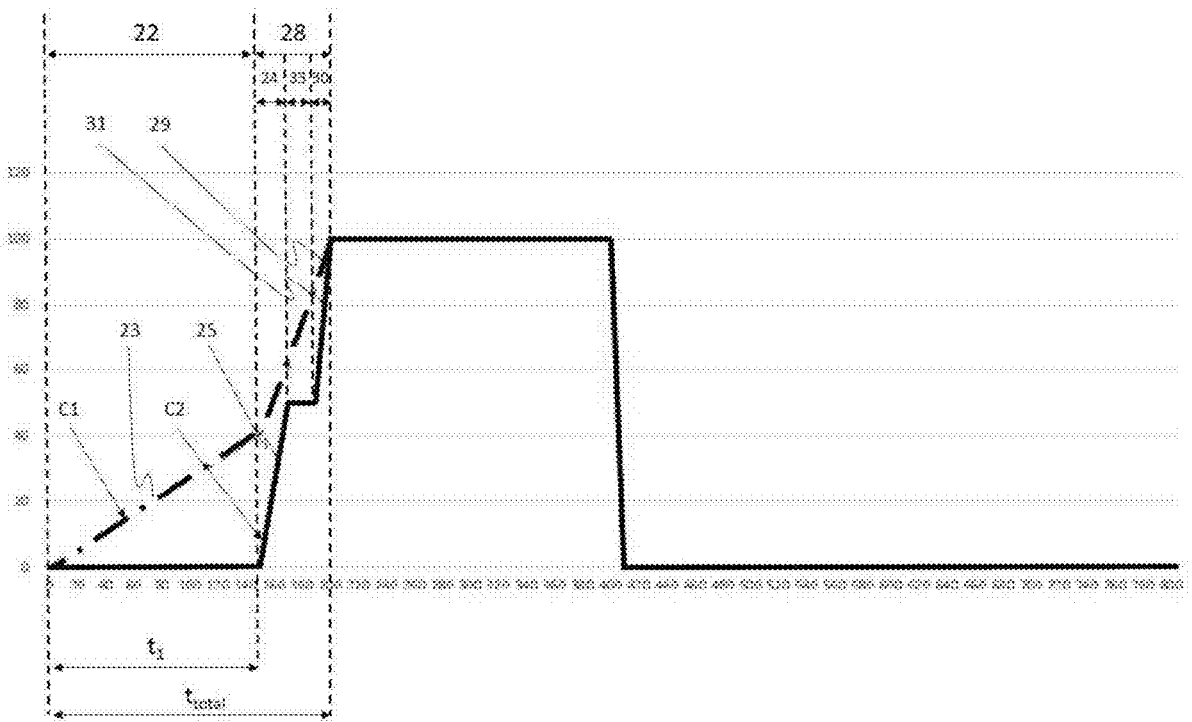
FIG. 4 is a set of two graphs showing the variation as a function of time in the control used to turn on the two light sources of FIG. 1, according to a first control law.
Figure 5:
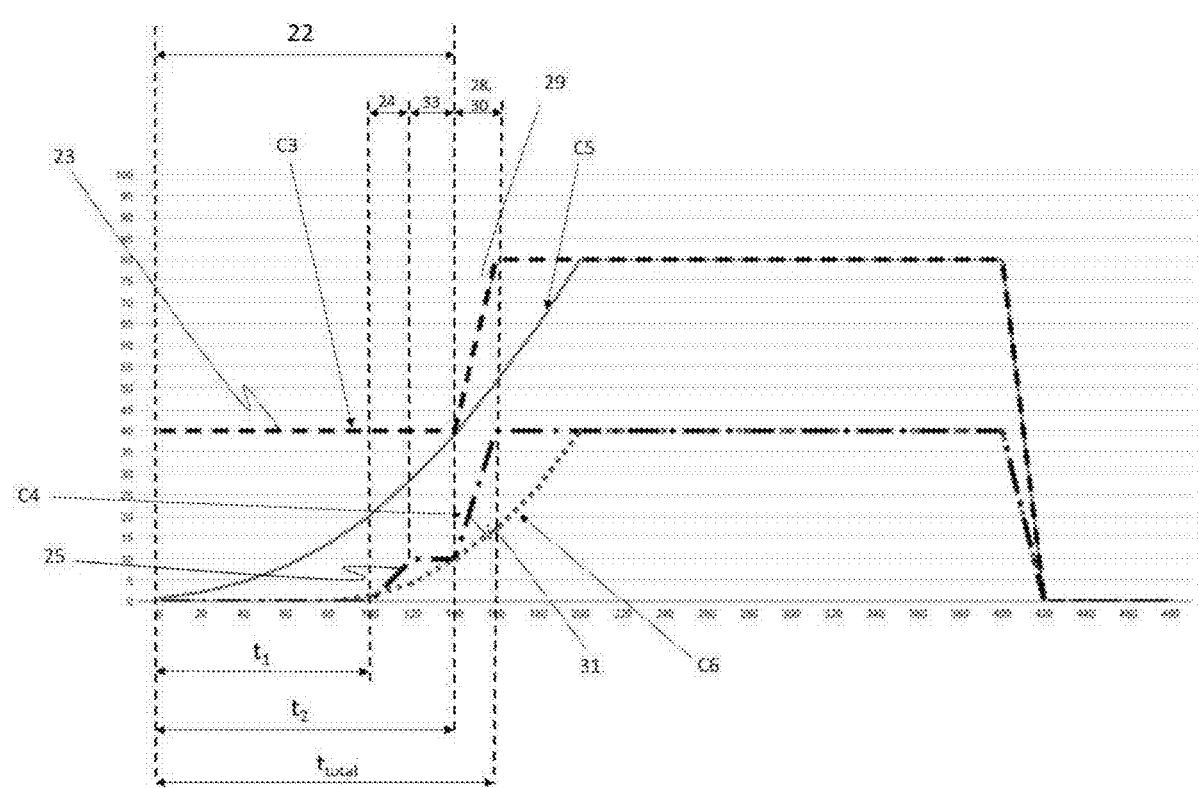
FIG. 5 is a set of four graphs showing the variation as a function of time in the raw control used to turn on the two light sources of FIG. 1, according to a second control law, and the variation as a function of time in the control signal applied in real time to these two light sources, according to the second control law transposed to a CIE XYZ 1931 color-space law.

Here, in the examples illustrated in FIGS. 4 and 5, the first duty-cycle value is equal to 40%.

The first control ramp 23 is shown in FIGS. 4 and 5. Specifically, FIGS. 4 and 5 show the variation as a function of time in the control used to turn on the two light sources 8A, 8B of FIG. 1, according to two distinct control laws. Here, the pulse-width-modulation-based turn-on control has been represented by its duty-cycle values, which are shown on the y-axis of the graph. The x-axis of the graph corresponds to the time of variation in the control.

The variation as a function of time in the control used to turn on the first light source 8A and of the second light source 8B, according to a first control law, has been shown in FIG. 4 by a curve C1 and by a curve C2, respectively. The variation as a function of time in the raw control used to turn on the first light source 8A and of the second light source 8B, according to a second control law, has been shown in FIG. 5 by a curve C3 and by a curve C4, respectively. The variation as a function of time in the control signal applied in real time to the first light source 8A and to the second light source 8B, according to the second control law transposed to a CIE XYZ 1931 color-space law, has been shown in FIG. 5 by a curve C5 and by a curve C6, respectively.

Such a CIE XYZ 1931 color-space law, which in particular gives luminance values as a function of pulse-width-modulation-based turn-on control values, makes it possible to smooth turn on of the two light sources 8A, 8B (as shown by curves C5 and C6 in FIG. 5). The CIE XYZ 1931 color-space law is typically centered on the color white, but may as a variant be adjusted to be centered on the color yellow, in particular for yellow light-emitting diodes. As a variant, control laws other than the CIE XYZ 1931 color-space law are envisionable for controlling turn-on of the two light sources 8A, 8B, such as linear laws for example.

The first phase 20 comprises a second step 24, performed after the start of the first step 22, in which pulse-width-modulation-based control according to a first control ramp 25 is used to turn on the second light source 8B, the first control ramp being up to a third duty-cycle value corresponding to a first intermediate illumination level of the second light source 8B. In the example illustrated in FIG. 4, the third duty-cycle value is equal to 50%. In the example illustrated in FIG. 5, the third duty-cycle value is equal to 10%.

The time interval separating the start of the first step 22 and the start of the second step 24 of the first phase 20 is called $t_1$ in FIGS. 4 and 5. This time interval $t_1$ may be parameterized beforehand depending on the characteristics desired for the scrolling effect. The duration of the first step 22 of the first phase 20 is called $t_2$ in FIG. 5. In the particular example of FIG. 4, the duration of the first step 22 and the time interval separating the start of the first step 22 and the start of the second step 24 are identical and called $t_1$.

The method comprises a second phase 26. This second phase 26 comprises a first step 28 in which pulse-width-modulation-based control according to a second control ramp 29 is used to turn on the first light source 8A to a second illumination level of the first light source 8A, the second control ramp being up to a second duty-cycle value. The slopes of the first and second ramps 23, 29 controlling turn-on of the first light source 8A are distinct. In the particular example of embodiment in FIG. 5, the slope of the first ramp 23 controlling turn-on of the first light source 8A is zero. The luminous intensity of the light emitted by the first light source 8A at its second illumination level is greater than the luminous intensity of the light emitted by the first light source 8A at its first illumination level. Preferably, the second illumination level of the first light source 8A corresponds to the maximum illumination level of this light source 8A. To this end, in the examples illustrated in FIGS. 4 and 5, the second duty-cycle value is equal to 100%.

The cumulative duration of the respective first steps 22, 28 of the first and second phases of the method is called $t_{total}$ in FIGS. 4 and 5. Preferably, the duration $t_1$, $t_2$ of the first step 22 of the first phase 20 is at least equal to half of this cumulative duration $t_{total}$, and at most equal to the entire cumulative duration. Also preferably, when the luminous device 1, 12 is a vehicle lighting and/or signaling light, and in particular a direction-indicating device, the duration $t_1$, $t_2$ of the first step 22 of the first phase 20 is greater than or equal to two thirds of this cumulative duration $t_{total}$. Also preferably, in the context of this particular vehicle-direction-indicating-device application, the cumulative duration $t_{total}$ is less than or equal to 200 ms. Also preferably, in the context of the same particular application, and as illustrated in FIG. 4, the luminous intensity of the light emitted by the first light source 8A at its first illumination level is less than or equal to 0.4 times the luminous intensity of the light emitted by the first light source 8A at its second illumination level.

The second phase 26 comprises a second step 30 in which pulse-width-modulation-based control according to a second control ramp 31 is used to turn on the second light source 8B to a second illumination level of the second light source 8B, the second control ramp being up to a fourth duty-cycle value. In the example illustrated in FIG. 4, the fourth duty-cycle value is equal to 100%. In the example illustrated in FIG. 5, the fourth duty-cycle value is equal to 40%. The slopes of the first and second ramps 25, 31 controlling turn-on of the second light source 8B are distinct.

In the particular example of embodiment in FIGS. 4 and 5, the first and second ramps 25, 31 controlling turn-on of the second light source 8B are separated by an intermediate plateau 33 of zero slope. This intermediate plateau 33 corresponds to a constant turn-on control signal corresponding to the first intermediate illumination level of the second light source 8B. In the example illustrated, the control signal of the intermediate plateau consists in applying the third duty-cycle value for the duration of the intermediate plateau 33.

As a variant (not shown), the first and second ramps 25, 31 controlling turn-on of the second light source 8B need not be separated by such an intermediate plateau. Turn-on of the second light source 8B is thus offset in time with respect to turn-on of the first light source 8A, both light sources reaching their maximum luminous-intensity value at the same time. The luminous intensity of the light emitted by the second light source 8B at its second illumination level is greater than the luminous intensity of the light emitted by the second light source 8B at its first illumination level. Preferably, the second illumination level of the second light source 8B corresponds to the maximum illumination level of this light source 8B. This case corresponds to the graph illustrated in FIG. 4. Here, the fourth duty-cycle value corresponding to the second illumination level of the second light source is equal to 100%.

Also preferably, the first step 22 of the first phase 20 is longer than the second step 30 of the second phase 26. In the particular embodiment illustrated in FIG. 5, the luminous intensity of the light emitted by the second light source 8B at its second illumination level (curve C6) is less than the luminous intensity of the light emitted by the first light source 8A at its second illumination level (curve C5). This makes it possible to prevent a visual effect that could create a "reverse flow of light" from the second light source 8B to the first light source 8A.

The first and second phases 20, 26 may overlap, as illustrated in FIG. 4 (specifically, in this figure the second phase 26 begins before the end of the first phase 20), or indeed they may be performed sequentially, as illustrated in FIG. 5 (in this figure, the second phase 26 starts when the first phase 20 ends). The first and second phases 20, 26 make it possible to obtain a scrolling effect in the light guide 6, in the direction pointing from the first light source 8A to the second light source 8B, with a better illumination beam refinement and uniformity than the prior-art solutions.

Preferably, the method comprises a following phase 32, which has not been illustrated in FIGS. 4 and 5. In this following phase 32, the driver 4 turns on at least one additional light source placed behind the light guide 6 (such an additional source has not been shown in the figures), so as to finalize illumination of the light guide 6.

In a final phase 35, the driver 4 turns off the first and second light sources 8A, 8B, and one or more optional additional light sources. When the luminous device 1, 12 is a vehicle lighting and/or signaling light, and in particular a direction-indicating device, the first and second light sources 8A, 8B and one or more optional additional light sources are for example turned off at the end of a total duration of the method substantially equal to 400 ms.

Alternatively to the final phase 35, the method may comprise a following phase 34, which is not illustrated in FIGS. 4 and 5. This following phase 34 comprises a first step 36 in which pulse-width-modulation-based control according to a first control ramp is used to turn on the first light source 8A to the first intermediate illumination level of the first light source 8A, the first control ramp being up to the first duty-cycle value. Phase 34 comprises a second step 38 in which pulse-width-modulation-based control according to a first control ramp is used to turn on the second light source 8B to the first intermediate illumination level of the second light source 8B, the first control ramp being up to the third duty-cycle value. The method may comprise another phase 40. This phase 40 comprises a first step 42 in which pulse-width-modulation-based control according to a second control ramp is used to turn off the second light source 8B. The slopes of the first and second ramps controlling turn-off of the second light source 8B are distinct. Phase 40 comprises a second step 44, performed after the first step 42, in which pulse-width-modulation-based control according to a second control ramp is used to turn off the first light source 8A. The slopes of the first and second ramps controlling turn-off of the first light source 8A are distinct.

These phases 34, 40, which make it possible to obtain a second scrolling luminous effect in the light guide 6 in the opposite direction to the first scrolling effect (and therefore in the direction pointing from the second light source 8B to the first light source 8A), may overlap (in this case, phase 40 starts before the end of phase 34) or indeed be performed sequentially (in this case, phase 40 starts when phase 34 ends).

The illumination beam generated by the light sources 8A, 8B of the luminous device 1 may advantageously be used to perform a regulatory photometric function, in particular a lighting and/or signaling photometric function of a vehicle, and preferably a direction-indicating function of the vehicle. The illumination beam generated by the luminous device 1, 12 may also be used to perform a photometric function of the "daytime running light" type, or it may even be used within interior lighting of a vehicle (the luminous device for example being mounted in the ceiling light of the vehicle), or indeed to produce a signature or visual animations on the vehicle.

What is claimed is:

1. A method for controlling turn-on of at least one assembly, the at least one assembly including a light guide that is at least partially transparent or translucent and two light sources, each light source being placed at a separate end of the light guide and being connected to the driver with the driver being configured to use pulse-width-modulation-based control to turn on the light source, and in that the method comprises:

employing a first phase with a pulse-width-modulation-based control according to a first control ramp to turn on the light source, the first control ramp being up to a first duty-cycle value corresponding to a first intermediate illumination level of the light source; and, employing a second phase with the pulse-width-modulation-based control according to a second control ramp to turn on the light source, the second control ramp being up to a second duty-cycle value corresponding to a second illumination level of the light source, the slopes of the first and second control ramps being distinct, the luminous intensity of the light emitted by the light source at its second illumination level being greater than the luminous intensity of the light emitted by the light source at its first illumination level, employing the first phase includes:

turning on a first light source with the pulse-width-modulation-based control according to a first control ramp, the first control ramp being up to a first duty-cycle value corresponding to a first intermediate illumination level of the first light source, and, turning on a second light source with the pulse-width-modulation-based control according to a third control ramp, the third control ramp being up to a third duty-cycle value corresponding to a first intermediate illumination level of the second light source; and employing the second phase includes:

turning on the first light source with the pulse-width-modulation-based control according to a second control ramp to a second illumination level of the first light source, the second control ramp being up to a second duty-cycle value corresponding to the second illumination level of the first light source, and, turning on the second light source with the pulse-width-modulation-based control according to a fourth control ramp to a second illumination level of the second light source, the fourth control ramp being up to a fourth duty-cycle value corresponding to the second illumination level of the second light source, wherein the slopes of the first and second control ramps, and of the third and fourth control ramps, respectively, are distinct.

2. The method as claimed in claim 1, further comprising maintaining the first intermediate illumination level of the second light source until the second illumination level of the second light source is enabled.

3. The method as claimed in claim 1, further comprising employing a third phase and a fourth phase, employing the third phase includes:

turning on the first light source with the pulse-width-modulation-based control according to a fifth control ramp to the first intermediate illumination level of the first light source, the fifth control ramp being up to the first duty-cycle value, and, turning on the second light source with the pulse-width-modulation-based control according to a sixth control ramp to the first intermediate illumination level of the second light source, the sixth control ramp being up to the third duty-cycle value, employing the fourth phase includes:

turning off the first light source with the pulse-width-modulation-based control according to a seventh control ramp, and, turning off the second light source with the pulse-width-modulation-based control according to an eighth control ramp, wherein the slopes of the fifth and eighth control ramps, and of the sixth and seventh control ramps, respectively, are distinct.

4. The method as claimed in claim 1, wherein the two light sources and the light-source driver are arranged in a vehicle luminous device, and wherein the luminous intensity of the light emitted by the first light source at its first illumination level is lower than the luminous intensity of the light emitted by the first light source at its second illumination level.

5. The method as claimed in claim 1, wherein a duration of turning on the first light source in the first phase is less than or equal to a cumulative duration of turning on the first light source of the first and second phases.

6. The method as claimed in claim 1, wherein the method is further applied to at least one additional light source, the at least one additional light source being placed behind the light guide, and wherein the method further includes a third phase in which the light-source driver turns on the at least one additional light source, so as to finalize illumination of the light guide.

7. A vehicle luminous device comprising at least one light guide that is at least partially transparent or translucent, at least one light source placed at one end of the light guide, and a light-source driver connected to the at least one light source, the at least one light guide includes, on an external surface, at least one striation extending substantially transversely to a main direction of extension of the light guide, with the driver is configured to employ a first phase with a pulse-width-modulation-based control according to a first control ramp to turn on the light source, the first control ramp being up to a first duty-cycle value corresponding to a first intermediate illumination level of the light source and employ a second phase with the pulse-width-modulation-based control according to a second control ramp to turn on the light source, the second control ramp being up to a second duty-cycle value corresponding to a second illumination level of the light source, the slopes of the first and second control ramps being distinct, the luminous intensity of the light emitted by the light source at its second illumination level being greater than the luminous intensity of the light emitted by the light source at its first illumination level, to turn on the at least one light source.

8. The luminous device as claimed in claim 7, further comprising at least one assembly, the at least one assembly including a light guide that is at least partially transparent or translucent and two light sources, each light source being placed at a separate end of the light guide, and wherein the driver is connected to each of the light sources and wherein employing the first phase includes turning on a first light source with the pulse-width-modulation-based control according to a first control ramp, the first control ramp being up to a first duty-cycle value corresponding to a first intermediate illumination level of the first light source and turning on a second light source with the pulse-width-modulation-based control according to a third control ramp, the third control ramp being up to a third duty-cycle value corresponding to a first intermediate illumination level of the second light source, and employing the second phase includes turning on the first light source with the pulse-width-modulation-based control according to a second control ramp to a second illumination level of the first light source, the second control ramp being up to a second duty-cycle value corresponding to the second illumination level of the first light source and turning on the second light source with the pulse-width-modulation-based control according to a fourth control ramp to a second illumination level of the second light source, the fourth control ramp being up to a fourth duty-cycle value corresponding to the second illumination level of the second light source, wherein the slopes of the first and second control ramps, and of the third and fourth control ramps, respectively, are distinct, to turn on each of the light sources.

9. The luminous device as claimed in claim 7, wherein the light source is placed at a respective end of a plurality of light guides that are at least partially transparent or translucent.

10. The luminous device as claimed in claim 9, wherein the light guides are placed so as to substantially define a corolla shape, the light source being placed at the center of the corolla.

11. The luminous device as claimed in claim 7, wherein the luminous device is a vehicle direction-indicating luminous device.

12. A vehicle headlamp comprising a luminous device that includes at least one light guide that is at least partially transparent or translucent, at least one light source placed at one end of the light guide, and a light-source driver connected to the at least one light source, with the driver is configured to employ a first phase with a pulse-width-modulation-based control according to a first control ramp to turn on the light source, the first control ramp being up to a first duty-cycle value corresponding to a first intermediate illumination level of the light source and employ a second phase with the pulse-width-modulation-based control according to a second control ramp to turn on the light source, the second control ramp being up to a second duty-cycle value corresponding to a second illumination level of the light source, the slopes of the first and second control ramps being distinct, the luminous intensity of the light emitted by the light source at its second illumination level being greater than the luminous intensity of the light emitted by the light source at its first illumination level, to turn on the at least one light source wherein employing the first phase includes:

turning on a first light source with the pulse-width-modulation-based control according to a first control ramp, the first control ramp being up to a first duty-cycle value corresponding to a first intermediate illumination level of the first light source, and, turning on a second light source with the pulse-width-modulation-based control according to a third control ramp, the third control ramp being up to a third duty-cycle value corresponding to a first intermediate illumination level of the second light source;

employing the second phase includes:

turning on the first light source with the pulse-width-modulation-based control according to a second control ramp to a second illumination level of the first light source, the second control ramp being up to a second duty-cycle value corresponding to the second illumination level of the first light source, and, turning on the second light source with the pulse-width-modulation-based control according to a fourth control ramp to a second illumination level of the second light source, the fourth control ramp being up to a fourth duty-cycle value corresponding to the second illumination level of the second light source, wherein the slopes of the first and second control ramps, and of the third and fourth control ramps, respectively, are distinct.

\* \* \* \* \*